United States Patent

Zeides et al.

[11] Patent Number: 5,513,905
[45] Date of Patent: May 7, 1996

[54] VALVE CONTROL DEVICE

[75] Inventors: Otto Zeides, Hepberg; Klaus Schirmer, Ingolstadt, both of Germany

[73] Assignee: Temic Telefunken microelectronic GmbH, Heilbronn, Germany

[21] Appl. No.: 354,871

[22] Filed: Dec. 9, 1994

[30] Foreign Application Priority Data

Dec. 18, 1993 [DE] Germany .......................... 43 43 325.1

[51] Int. Cl.$^6$ .............................. B60T 13/66; B60T 8/32; F15B 13/08
[52] U.S. Cl. ...................................... 303/119.2; 303/113.1
[58] Field of Search .............................. 303/119.2, 113.1, 303/113.3, 119.1, 113.2; 137/884, 596.16, 596.17, 625.64, 625.66, 854, 487.5, 560; 251/129.01, 129.15, 129.21, 129.06; 439/76, 34, 672, 692, 723; 336/192, 92; 335/219, 202, 277, 278, 299

[56] References Cited

U.S. PATENT DOCUMENTS

| 5,374,114 | 12/1994 | Burgdorf et al. | 303/119.2 |
| 5,407,260 | 4/1995 | Isshiki et al. | 303/119.2 |

FOREIGN PATENT DOCUMENTS

| 1257910 | 1/1968 | Germany . |
| 3613863 | 10/1987 | Germany . |
| 3742830 | 7/1989 | Germany . |
| 3813138 | 11/1989 | Germany . |
| 8815427 | 5/1990 | Germany . |
| 4001017 | 7/1991 | Germany . |
| 4013160 | 10/1991 | Germany . |
| 4100967 | 7/1992 | Germany . |
| 4104804 | 8/1992 | Germany . |
| 9112965 | 4/1993 | Germany . |
| 4133641 | 4/1993 | Germany . |

*Primary Examiner*—Douglas C. Butler
*Attorney, Agent, or Firm*—Spencer & Frank

[57] ABSTRACT

A valve control device of the kind used in ABS or ASR systems as applied in motor vehicles. Such a valve control device comprises a valve block that accommodates the solenoid valves and where a solenoid is assigned to each solenoid valve. The side of a solenoid holder facing the valve block has compartments for accommodating the solenoids, there being an elastic spring element on its compartment base that presses the solenoid against the valve block. Furthermore, each solenoid has first media that, when the solenoid is introduced into this compartment, act together with second media, assigned to the compartment, as a snap latch in such a way as to prevent the solenoid from being pulled out from this compartment. The first and second media are sufficiently elastic that the solenoid can still be moved slightly in all directions in the plane perpendicular to its coil axis.

5 Claims, 3 Drawing Sheets

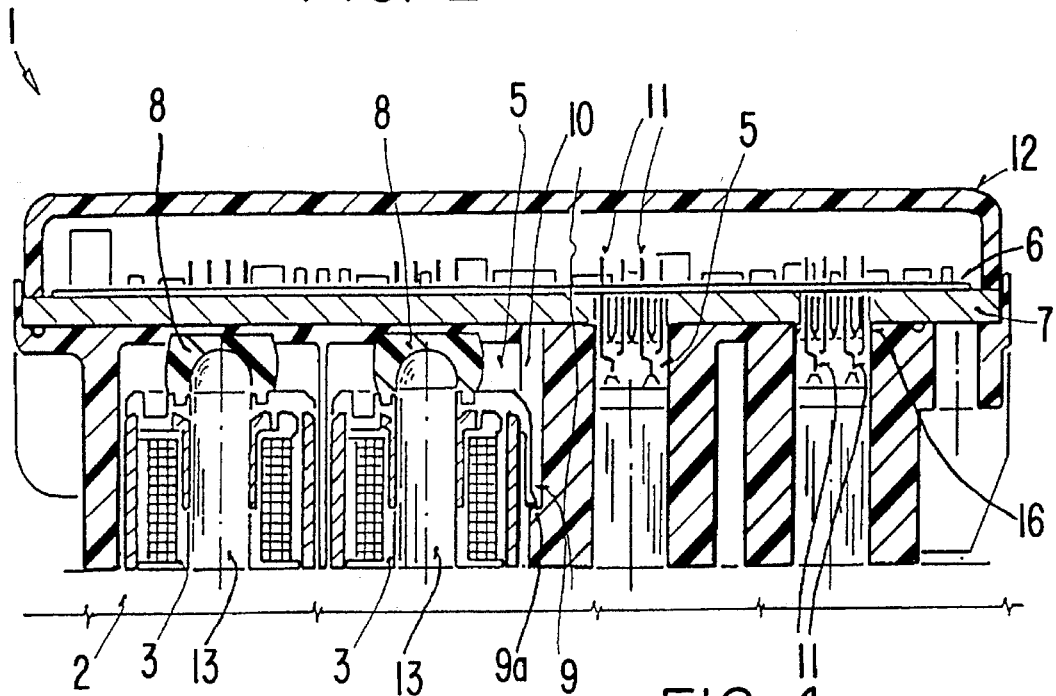
FIG. 2
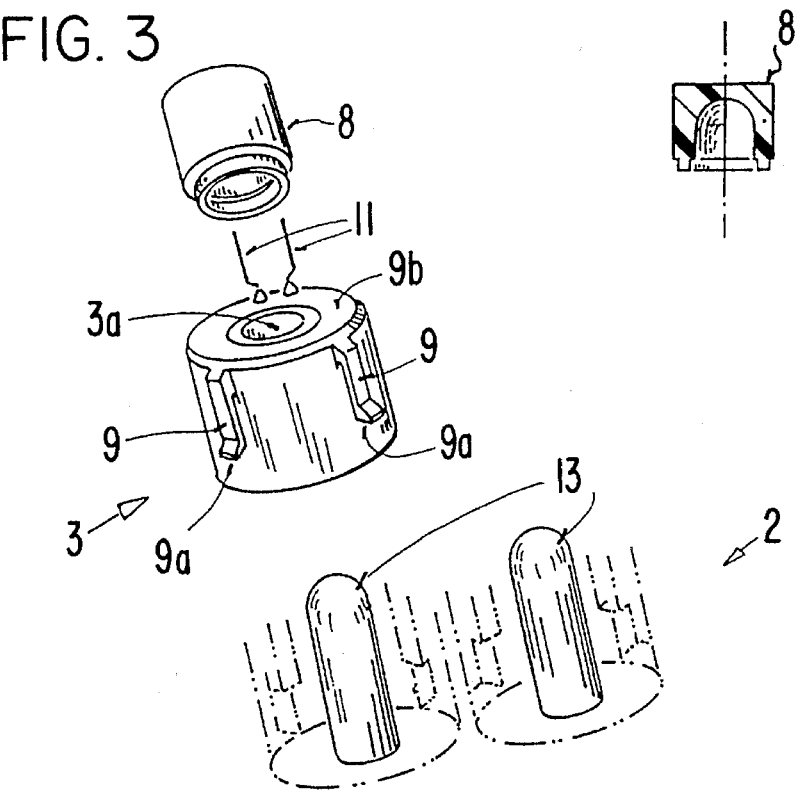
FIG. 3
FIG. 4

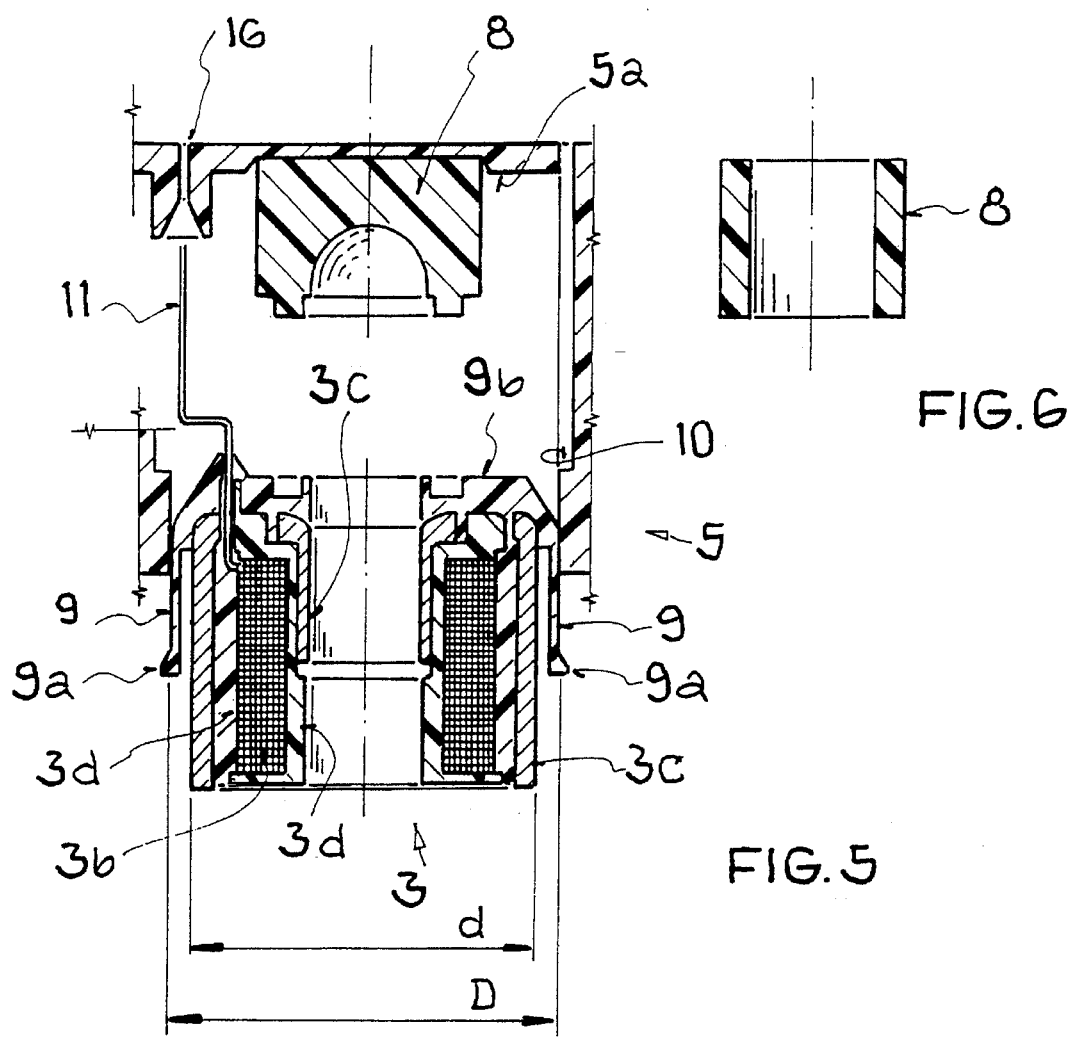
FIG. 5
FIG. 6
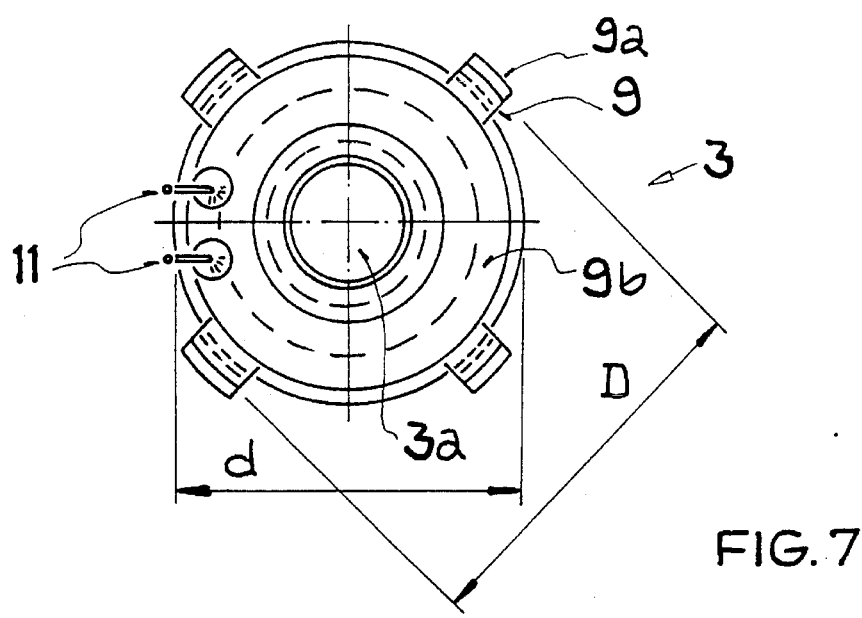
FIG. 7

VALVE CONTROL DEVICE

BACKGROUND OF THE INVENTION

The invention relates to a valve control device for controlling a hydraulic or pneumatic system with several solenoid valves arranged in a valve block, each valve having a magnet coil (solenoid) assigned to it and placed in a coil holder.

An ABS (anti-blocking) system has increasingly become part of the standard equipment in a motor vehicle these days. It allows the braking behavior of each wheel of the motor vehicle to be controlled by an inlet valve and an outlet valve assigned to this wheel, so that a total of eight solenoid valves form a hydraulic system. Additionally, other solenoid valves can be provided for an ASR (anti-slip regulation) system. These solenoid valves are controlled from solenoids through a control electronics system that is generally situated in the passenger cell of the motor vehicle. A disadvantage here is the cable harness required to connect the magnet coils to the control electronics. The solenoids are pushed onto the valve dome provided on the valve block, with the solenoids themselves being located by a coil holder. Since the position of the solenoids is defined by the valve dome, the coil holder must have a high fitting accuracy for the solenoids. Furthermore, the coil holder must ensure that there is sufficient magnetic continuity between each solenoid and the valve block to guarantee a positive response of the valve needles that move in the valve domes.

SUMMARY OF THE INVENTION

The object of the invention is to specify a valve control device of the type described at the outset that can be manufactured easily and hence at low cost and that at the same time ensures reliable magnetic continuity between each solenoid and the valve block.

According to the invention, on the side of the solenoid holder facing away from the valve block, a printed circuit board is provided to accommodate the control electronics, so that a cable harness is not required. Furthermore, the side of the solenoid holder facing towards the valve block has compartments for accommodating the solenoids, with the depth of these compartments being approximately equivalent to the length of the solenoids. Furthermore, at the base of each compartment there is an elastic spring element that presses the solenoid against the valve block.. Finally, each solenoid has first media (elements, means) that, on introducing the solenoid into the compartment, act together with second media (elements, means) assigned to the compartment to provide a snap latch function whereby withdrawal of the solenoid from the compartment is prevented. The first and the second media are sufficiently elastic to allow slight displacement of the solenoid in all directions in the plane perpendicular to its coil axis.

The elastic spring elements ensure that the solenoids are constantly pressed against the valve block, thus providing adequate magnetic continuity. With the solenoids held mobile by the first and second media, dimensional differences between the compartments with respect to the valve dome distances are compensated so that the coil holder need not display such a high dimensional accuracy with respect to the compartment distances.

When the printed circuit board has been fitted to the coil holder, the solenoids are introduced into the coil holder compartments in such a way .that their connecting wires are taken directly to the printed circuit board to which they are suitably attached by soldering.

A particularly advantageous embodiment of the first and second media results from the first media being comprised of several elastic holding fingers attached to one side of the solenoid and on the free ends of each of which there is a latch that, on introducing the solenoid, snaps under spring action into a slot provided as a second medium arranged on the periphery of the compartment. In a preferred embodiment, the holding finger can be attached to the face end of the solenoid in contact with the compartment base and have a length of roughly half the length of the solenoid.

The valve control device in accordance with the invention can be applied advantageously in an ABS or ASR system of a motor vehicle.

BRIEF DESCRIPTION OF THE DRAWINGS

The invention will now be described and explained on the basis of an embodiment example in conjunction with the drawings.

FIG. 2 is a sectional view of the control device shown in FIG. 1.

FIG. 3 is an exploded view of a solenoid, spring element and assigned valve dome of the control device shown in FIG. 1.

FIG. 4 is a sectional view of the spring element shown in FIG. 3.

FIG. 5 is a sectional view of a coil compartment with associated solenoid on introducing this solenoid into the coil compartment.

FIG. 6 is a sectional view of the spring element used in the coil compartment shown in FIG. 5.

FIG. 7 is a top view on a solenoid with holding fingers and connecting wires.

In the drawings, parts and components that are identical or have identical functions have been given the same reference numbers.

DESCRIPTION OF THE PREFERRED EMBODIMENTS

Figure 1:
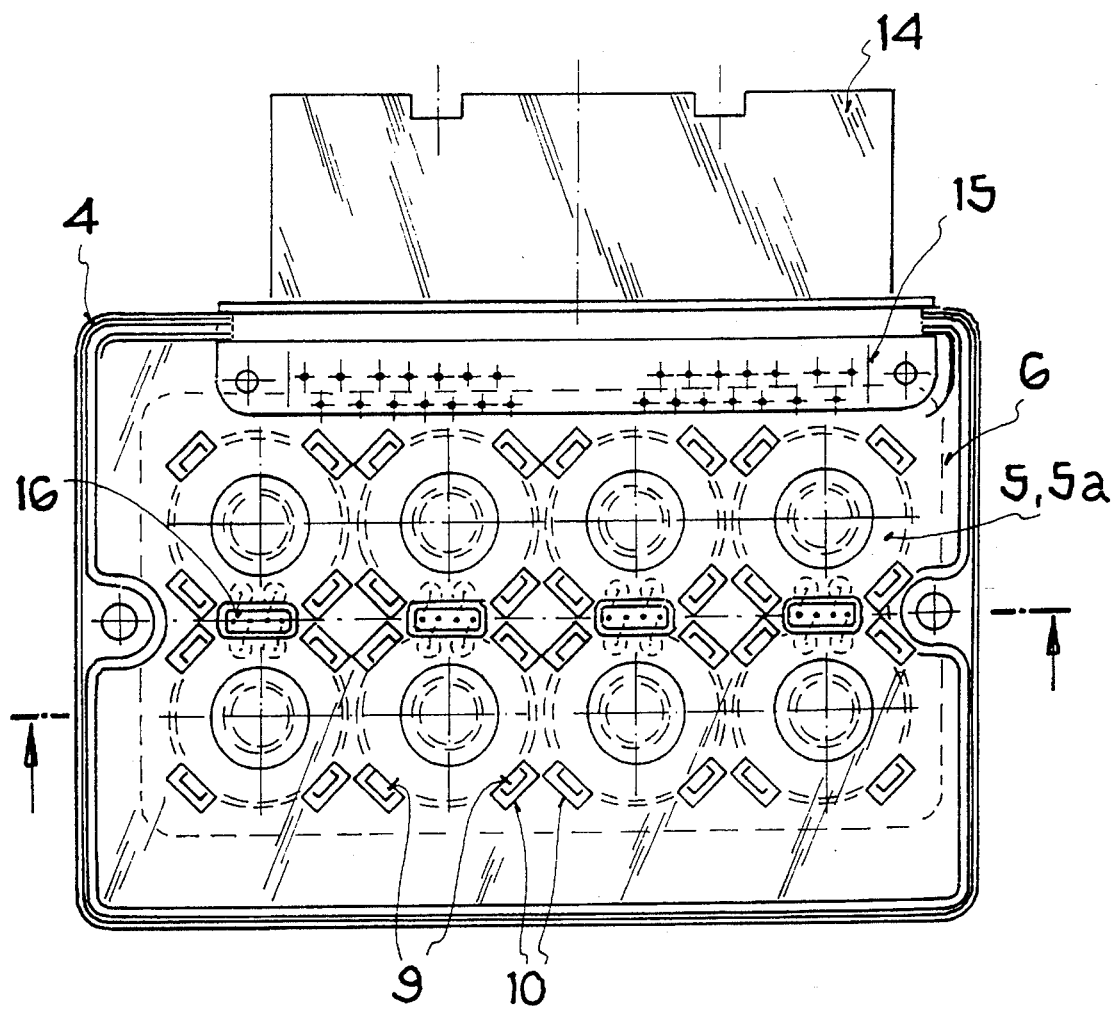
FIG. 1 is a top view on a control device in accordance with the invention with an arrangement of eight solenoids.

The valve control device shown in FIGS. 1 and 2 has eight solenoids 3 that are controlled from a control electronics system arranged on a printed circuit board 6. A valve control device of this kind is used in ABS and ASR control systems. The eight solenoids 3 mentioned above are arranged in two parallel rows of four solenoids, and in each case two solenoids opposite to each other control an outlet valve and an inlet valve of a brake assigned to one wheel on a vehicle.

According to FIG. 2, the valve control device 1 comprises a coil holder 4 that has eight coil compartments 5 for the purpose of accommodating the solenoids 3. Ring coils with a centre hole 3a are used as solenoids 3 (refer to FIG. 3) where, in accordance with FIG. 5, a solenoid 3 of this kind is made up of a wire winding 3b and a ring yoke 3c and is moulded with a potting compound 3d. Such solenoids 3 are placed in the compartments 5 of the coil holder 4, while at the same time the connecting wires 11 are threaded into through holes 16 that are located between opposite compartments 5 in the plane of the compartment base 5a (refer to FIGS. 1 and 5). A coil holder 4 fitted in this way is so placed on a valve block 2 holding the valves that the valve domes 13 extend into the centre holes 3a of the solenoids 3 and these solenoids 3 fit on the valve block so well that optimum magnetic continuity is established between the ring yoke 3c of the solenoids 3 and the valve block 2 (refer to FIGS. 2 and 3).

To ensure that the solenoid 3 presses securely against the valve block 2, a spring element 8 is placed between the solenoid 3 and the compartment base 5a, as shown in FIGS. 2, 3 and 5. As shown in FIGS. 2, 3, 4 and 5, this spring element 8 is made in the form of an elastic hood but, as shown in FIG. 6, it can also be in the form of an elastic sleeve. If the coil holder 4 is built together with the valve block 2, as shown in FIG. 2, this elastic spring element 8 constantly exerts pressure on the solenoid 3 so that its ring yoke 3c is in good contact with the valve block 2. The solenoid 3 has not only the above-mentioned parts 3b, 3c and 3d as shown in FIGS. 5 and 7, but also a holding spider 9b onto which are flanged holding fingers 9 that are distributed uniformly around the periphery of the solenoid. This holding spider 9b is situated at that face end of the solenoid 3 that comes into contact with the compartment base 5a through the elastic spring element 8 (refer also to FIG. 3). The four holding fingers 9 provided on each solenoid 3 are aligned parallel to the longitudinal axis of the solenoid and are attached at one end to the face end and are aligned almost parallel to the peripheral surface of the ring yoke 3c. This causes the actual outside diameter d of the solenoid 3 to be increased to a diameter D at those places where the holding fingers 9 are attached (refer to FIGS. 5 and 7). In order to be able to introduce such a solenoid 3 into a compartment 5, there are recesses in the compartment walls in the region of the holding finger 9 so that in this region the clearance diameter of the compartment 5 is the same as the diameter D given by the holding finger. 9. On introducing the solenoid 3 into the compartment 5, the latch 9a provided on the outside of the free end of the holding finger 9 now contacts the edge of the compartment 5. Since the holding fingers 9 are elastic, the latch 9a is pushed towards the peripheral surface of the solenoid when the solenoid 3 is introduced further. When the solenoid 3 has been fully introduced into the compartment 5, the holding finger 9 with the latch 9a can relax in a slot 10 that is also situated in the compartment wall. When the solenoid has been fitted, the latch thus contacts the end of the slot 10 thus preventing the solenoid from falling out Of the compartment 5 on its own, as can be seen from FIG. 2.

The main advantage of the holding finger 9 in the fitted condition of the solenoids 3 is that these can be displaced by a small amount perpendicularly to their longitudinal axis because of the elastic holding fingers 9. Consequently, any dimensional inaccuracies between the valve block 2 and the coil holder 4 are compensated which means that the coil holder 4, and especially the coil compartments 5, need not be dimensioned to such an accurate fit. The position of the solenoids 3 thus adapts to those of the valve domes 13 of the valve block 2.

Each solenoid has two connecting wires 11 which are taken through appropriate through holes 16 in the region of the compartment base of the coil holder 4 to the printed circuit board 6 in order to be soldered there (refer to FIG. 2). The through holes 16 of two opposite solenoids, each in one row of the solenoid arrangements, are in each case grouped together in one row, as shown in FIG. 1.

On the side of the coil holder 4 that supports the printed circuit board 6, there is also an edge connector 15 on one longitudinal side that is connected by connecting leads to the printed circuit board. Since this control device 1 can be situated in the engine compartment, the connection to a central electronics system situated in the passenger compartment is established by means of a connecting cable the connector of which is taken up and centered by a connector compartment 14 flanged onto the coil holder 4 (refer to FIG. 1). Since the control electronics for the solenoid valves are also usually situated in the passenger compartment, there is now .no cable connection because the printed circuit board 6 that holds the control electronics is also taken up by the coil helder 4.

As shown in FIG. 2, the printed circuit board 6, a flexible printed circuit board, can be used, supported by a base plate 7. Such a base plate 7 is made preferably of aluminum. Finally, the side of the coil holder 4 carrying the printed circuit board 6 is covered by a hood-shaped cover 12 which thus, together with the coil holder 4, forms a complete housing.

When applying in a motor vehicle a valve control device of the type described here, it must be fit for use in the passenger compartment, i.e. it must be protected in particular against the ingress of moisture. For this purpose, the valve control device 1 is moulded with an elastic material, such as silica gel, as shown in FIG. 2, so that all remaining cavities both in the region of the coil compartments 5 and in the region of the printed circuit board 6 are filled. Due to the elastic property of the potting compound, the solenoids 3 can still be moved both along the longitudinal axis and also perpendicularly to the longitudinal axis of the solenoids.

The valve control device in accordance with the invention is not limited to the application in ABS and ASR systems but can be used in all areas of a motor vehicle where solenoid valves are put to use.

What is claimed is:

1. Valve control device for controlling a hydraulic/pneumatic system including several solenoid valves arranged in a valve block, with each such valve having a solenoid assigned to it and being arranged in a coil holder having a side facing away from the valve block and a side facing the valve block, and wherein:

a) a printed circuit board is provided and situated on the side of the coil holder facing away from the valve block and holding a control electronics system;

b) the side of the coil holder facing the valve block has coil compartments to accommodate the solenoids, with the depth of these compartments corresponding approximately to the length of the respective solenoids;

c) between each solenoid and the associated coil compartment base there is an elastic spring element that presses the solenoid against the valve block;

d) each solenoid has first media that act together with a second medium assigned to the coil compartment to provide a snap latch function on introducing the solenoid into the coil compartment such that the solenoid is prevented from being pulled out of the coil compartment; and e) the first and the second media are sufficiently elastic that the solenoid can still be moved slightly in all directions in the plane perpendicular to its coil axis.

2. Valve control deice in accordance with claim 1, wherein the connecting wires of each of said solenoids are taken directly to the printed circuit board.

3. Valve control device in accordance with claim 2, wherein the first media are made up of several elastic holding fingers attached on one side to the solenoid and on the free ends of which there is, in each case, a latch that, when the solenoid is introduced into the coil compartment, latches under spring action into a slot which is provided as said second medium and is located on the periphery of the coil compartment.

4. Valve control device in accordance with claim 3, wherein each holding finger is attached to a face end of the solenoid facing towards the coil compartment base and has a length equal to approximately half the length of the solenoid.

5. Use of a valve control device in accordance with claim 4 for an ABS (anti-blocking) system and/or an ASR (anti-slip regulation) system of a motor vehicle.

* * * * *